United States Patent [19]

Takayama

[11] Patent Number: 5,792,717
[45] Date of Patent: Aug. 11, 1998

[54] SLIDING MATERIAL

[75] Inventor: Hirokazu Takayama, Tokyo, Japan

[73] Assignee: Ebara Corporation, Tokyo, Japan

[21] Appl. No.: 962,950

[22] Filed: Oct. 21, 1997

Related U.S. Application Data

[63] Continuation of Ser. No. 451,164, May 26, 1995, abandoned.

[30] Foreign Application Priority Data

May 26, 1994 [JP] Japan .................. 6-112696
May 24, 1995 [JP] Japan .................. 7-125304

[51] Int. Cl.$^6$ ............................................... C04B 35/56
[52] U.S. Cl. ........................... 201/88; 508/107; 508/108; 384/907.1; 384/913
[58] Field of Search ................... 508/107, 108; 501/88; 384/907.1, 913

[56] References Cited

U.S. PATENT DOCUMENTS

| | | | |
|---|---|---|---|
| 3,224,966 | 12/1965 | Li | 508/108 |
| 3,288,615 | 11/1966 | Estes | 252/12.2 |
| 3,380,843 | 4/1968 | Davis | 252/12.2 |
| 4,294,712 | 10/1981 | Ueno et al. | 508/109 |
| 4,336,150 | 6/1982 | Dorrell | 252/12.2 |
| 4,448,833 | 5/1984 | Yamaguchi et al. | 428/116 |
| 4,488,977 | 12/1984 | Patrichi | 252/12.2 |
| 4,501,676 | 2/1985 | Moorhouse | 252/12.2 |
| 4,560,478 | 12/1985 | Narumiya | 210/496 |
| 4,575,429 | 3/1986 | Jacobson | 252/12.2 |
| 4,655,610 | 4/1987 | Al-Jaroudi | 252/12.2 |
| 4,655,944 | 4/1987 | Mori . | |
| 4,664,595 | 5/1987 | Seiichi Tsuji et al. . | |
| 4,797,009 | 1/1989 | Yamazaki | 384/100 |
| 4,798,744 | 1/1989 | Goldstein et al. | 427/389.9 |
| 4,932,438 | 6/1990 | Kitamura et al. | 137/625.17 |
| 5,091,098 | 2/1992 | Tanaka et al. . | |
| 5,114,886 | 5/1992 | Tsukada | 252/12.2 |
| 5,158,916 | 10/1992 | Claussen | 501/127 |
| 5,298,179 | 3/1994 | Ukita et al. | 252/62.54 |
| 5,368,918 | 11/1994 | Harada et al. | 428/219 |
| 5,415,791 | 5/1995 | Chou et al. | 508/107 |
| 5,447,774 | 9/1995 | Tanaka et al. | 252/12.2 |

FOREIGN PATENT DOCUMENTS

| | | |
|---|---|---|
| 832 679 | 2/1955 | Germany . |
| 1 042 303 | 10/1958 | Germany . |
| 77 01 761 | 6/1977 | Germany . |
| 61-132575 | 6/1986 | Japan . |
| 61-281086 | 12/1986 | Japan . |
| 2 211 214 | 6/1989 | United Kingdom . |

OTHER PUBLICATIONS

Journal of Tribology, vol. 108, pp. 514–521, Oct. 1986, H. Ishigaki, et al., "Friction And Wear Of Hot Pressed Silicon Nitride And Other Ceramics".

Patent Abstracts of Japan, vol. 18, No. 639 (C–1282), JP–6–248108, Sep. 6, 1994, Considered Only English Abstract.

Patent Abstracts of Japan, vol. 18, No. 511, (C–1253), JP–6–172553, Jun. 21, 1994, Considered Only English Abstract.

Patent Abstracts of Japan, vol. 18, No. 1 (C–1148), Jan. 6, 1994, JP–5–246781, Sep. 24, 1993, Considered Only English Abstract.

(List continued on next page.)

*Primary Examiner*—Margaret Medley
*Attorney, Agent, or Firm*—Oblon, Spivak, McClelland, Maier & Neustadt, P.C.

[57] ABSTRACT

Sliding material comprising a porous ceramic body that has the open pores filled with a high water absorbing resin, preferably to an open pores porosity of ca. 5–15%. The sliding material may be used to fabricate members of the stationary part of a journal bearing in a pump for use in both a fluid and a gaseous atmosphere; members of the rotating part of the bearing are formed of a cemented hard alloy. Since the resin absorbs and retains water, the sliding material will exhibit satisfactory performance even if it is exposed to a gaseous atmosphere without lubrication. Consistent sliding performance is insured not only in fresh water but also in fluids such as slurries that contain hard solid matter.

8 Claims, 5 Drawing Sheets

OTHER PUBLICATIONS

Patent Abstracts of Japan, vol. 14, No. 68 (C–686), Feb. 8, 1990, JP–1–290577, Nov. 22, 1989, Considered Only English Abstract.

Patent Abstracts of Japan, vol. 12, No. 41 (M–666), Feb. 6, 1988, JP–62–194024, Aug. 26, 1987, Considered Only English Abstract.

Patent Abstracts of Japan, vol. 9, No. 31 (M–436), Dec. 7, 1985, JP–60–146916, Aug. 2, 1985, Considered Only English Abstract.

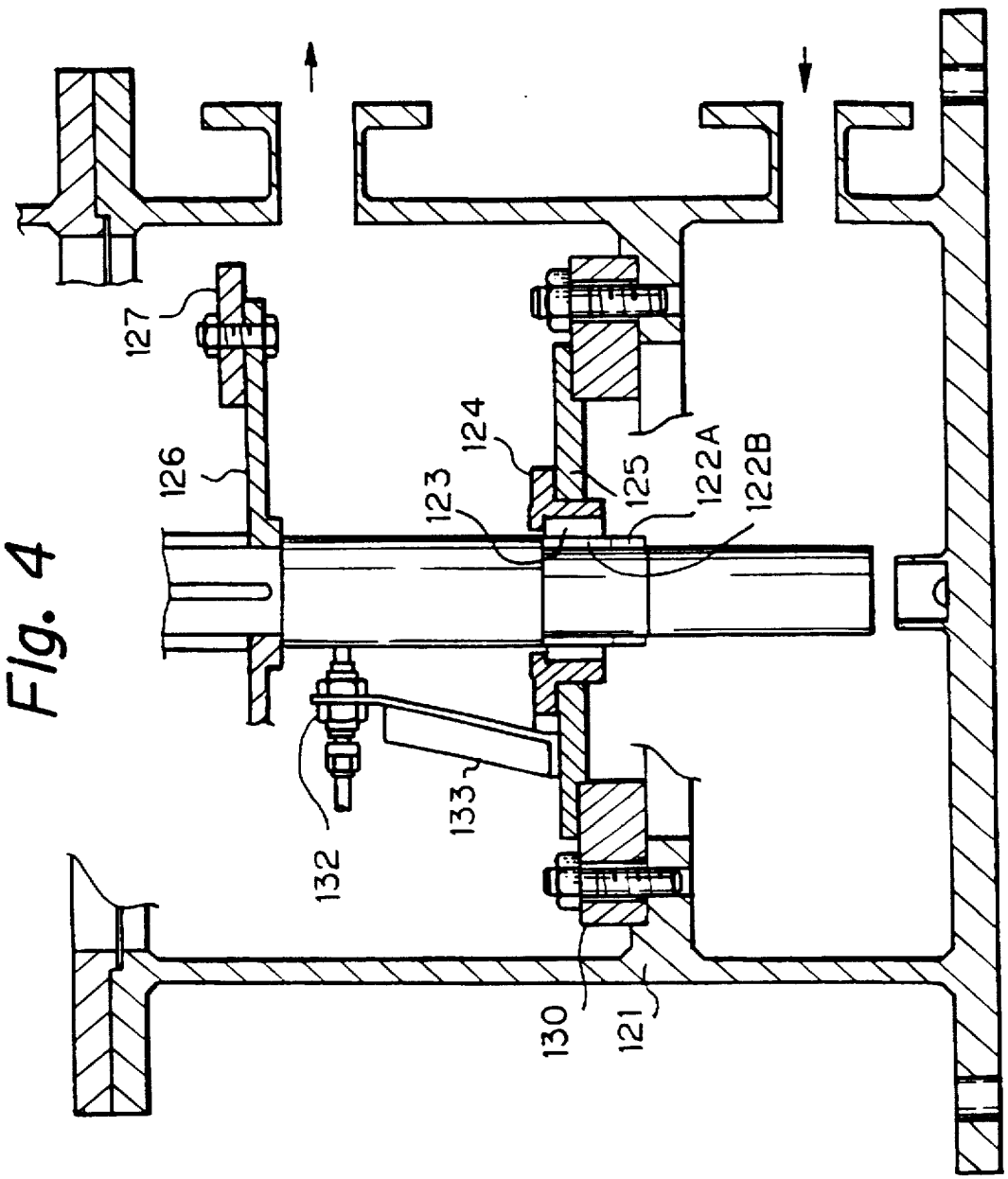

SLIDING MATERIAL

This application is a Continuation of application Ser. No. 08/451,164, filed on May 26, 1995, now abandoned.

BACKGROUND OF THE INVENTION

1. Field of the Invention

This invention relates to ceramic sliding materials that exhibit outstanding sliding performance not only in water but also in a gaseous atmosphere. More particularly, the invention relates to sliding materials that can be used successfully in a wide variety of pumps, including vertical axial-flow pumps, vertical mixed-flow pumps, vertical centrifugal pumps, horizontal axial-flow pumps, horizontal mixed-flow pumps and horizontal centrifugal pumps as materials of construction of submersible bearings that are exposed to a gaseous atmosphere at pump startup or toward the end of its operation but which are submerged in water during steady-state operation.

2. Discussion of the Background

Materials for use under sliding contact with other materials are required to have an overall sliding performance which is necessary to insure satisfactory sliding action and which includes not only a self-lubricating property and wear resistance but also freedom from damage to the mating material, small frictional heat generation and the absence of chattering. Bearings used in power transmission systems are a typical example of sliding parts intended for use under sliding conditions and, hence, are required to have this general sliding performance. In particular, submersible bearings in pumps, which are to be used in a variety of applications, such as water irrigation and drainage in agriculture, and the drainage of rain water and sewage in cities, are expected to have much higher resistance to corrosion and wear since the sliding faces are used under such hostile conditions that those bearings are exposed to flowing fluids, occasionally corrosive fluids, or to slurries containing hard solid matter.

A class of pumps that are in common use today are vertical pumps. While vertical pumps include axial-flow, mixed-flow and centrifugal types, they share the common feature that comprises a stationary water conducting part and a rotating part. The rotating part or rotor starts to rotate when driven with a motor installed near the top of the pump and the bearings which are positioned above the impeller support the radial load of the rotor via the sleeve fitted over the latter. Some of these bearings are located above the outside water level at pump startup or toward the end of its operation and will not contact the surrounding water. In other words, a certain number of the bearings are exposed to a gaseous atmosphere at pump startup and toward the end of its operation (i.e., operations under dry conditions) but submerged in water during steady-state operation.

If the bearings used in vertical pumps are submerged in the water to be pumped, the water per se works as a lubricant and there is no need to use any solid or liquid lubricants. However, it is important to insure that the bearings can perform consistently to exhibit the intended sliding action while they are exposed to a gas atmosphere during operations under dry conditions.

Sliding materials conventionally used in submersible bearings include different types of rubber (e.g., NMR or nitrile-butadiene rubber), metals (e.g., brass) and resins (e.g., teflon). Rubber will exhibit extremely consistent sliding performance if used in fresh water or under lubrication with water or oils or in fresh water. However, the biggest problem with rubber is that if used in a gaseous atmosphere and without lubrication, it will generate intense heat from the sliding parts and is damaged in a short time so as to no longer become effective as sliding members. Therefore, at the startup and toward the end of the operation of pumps that use rubber as the material of construction of the submersible bearings which are used within either water or a gaseous atmosphere, lubricant oils are supplied or water is injected to the rubber sliding parts from separately provided lubricant supply units with a view to protecting those sliding parts which are exposed to the gaseous atmosphere. A problem with this approach is that if the pump is very large with a shaft length extending to several tens of meters, many bearings must be used and the need to install a lubricant supply unit for each bearing adds considerably to the equipment cost.

Metals such as brass lack self-lubricating properties and are incapable of resisting sliding under dry conditions.

Resins, on the other hand, have good self-lubricating properties and have the advantage that they can be used in applications that cause a corrosion of metals such as in acidic or alkaline environments. However, resins suffer a serious defect in that when used in slurries containing hard solid matter, they are prone to wear under the abrasive action of the latter.

Ceramics are generally high in hardness and compressive stress, are good electric insulators and are resistant to electrochemical corrosion. Because of these advantages, ceramics are the subject of intensive studies in recent years, as taught in JPA 87/27382. On the other hand, ceramics have high frictional coefficients and are poor in self-lubricating properties and, in order to use them as sliding materials, they are lubricated with highly viscous oils or composites with solid lubricants. JPA 83/161982 proposed binding fluoropolymers to ceramics; JPA 82/118080 proposed impregnating porous ceramic bodies with tetrafluoroethylene or chlorotrifluoroethylene resins or mixtures thereof with molybdenum disulfide, tungsten disulfide, molybdenum selenide or tungsten selenide; and JPA 86/281086 proposed sliding materials having oils of fluoro-compounds such as fluoroethylene and fluorosilicone impregnated in open pores in porous ceramic bodies. These proposals, however, will not prove very effective in the case where pump startup and shutdown are cyclically repeated because the impregnated resins or oils will come off or separate from the ceramics and the initial sliding characteristics of the latter cannot be maintained for a prolonged period. Hence, bearings that comprise porous ceramic bodies impregnated with resins or oils are not expected to perform satisfactorily during sliding under dry conditions.

SUMMARY OF THE INVENTION

Therefore, an object of the invention is to provide bearings for use with pumps that exhibit such a good self-lubricating property as to eliminate the need to install separate lubricant supply units that have heretofore been used to supply lubricant oils or inject water into ceramic sliding parts in order to protect them as they are exposed to a gaseous atmosphere at pump startup or toward the end of its operation.

Another object of the invention is to provide ceramic sliding materials that will exhibit consistent sliding performance not only in fresh water but also in other fluids such as sea water and river water that contains sand and other hard solid matter and which will perform satisfactorily even if they are exposed to a gaseous atmosphere.

Still another object of the invention is to provide ceramic sliding materials that can successfully be used as construction materials for submersible bearings in various types of pumps that are intended to handle not only fresh water but also slurries and other fluids, including vertical axial-flow pumps, vertical mixed-flow pumps, vertical centrifugal pumps, horizontal axial-flow pumps, horizontal mixed-flow pumps and horizontal centrifugal pumps.

Yet another object of the invention is to provide durable submersible bearings that are to be fitted in pumps designed for handling fluids such as sea water and river water that contains hard solid matter.

The present inventors conducted intensive studies in order to attain these objects of the invention and found that porous ceramic bodies that were filled with a high water absorbing resin in open pores retained the inherent desirable properties of the ceramic material such as high resistance to wear and corrosion, which combined with the capabilities of the high water absorbing resin to absorb and retain large amounts of water, thereby assuring that the ceramic bodies would exhibit an outstanding self-lubricating property even when exposed to gaseous atmospheres.

Thus, in one aspect, the present invention relates to a ceramic sliding material that has open pores in a porous ceramic body filled with a high water absorbing resin. Preferably, the volume of the open pores is from about 5 to about 15%.

In another aspect, the invention relates to a submersible bearing for use in both a fluid and a gaseous atmospheres, characterized in that members of the rotating part of said bearing are made of a cemented hard alloy whereas members of the stationary part are made of a porous ceramic body that has open pores filled with a high water absorbing resin. Preferably, the volume of the open pores in the porous ceramic body is from about 5 to about 15%.

BRIEF DESCRIPTION OF THE DRAWINGS

FIG. 4 shows diagrammatically the sliding tester used in Example 1;

DESCRIPTION OF THE PREFERRED EMBODIMENT

Figure 1:
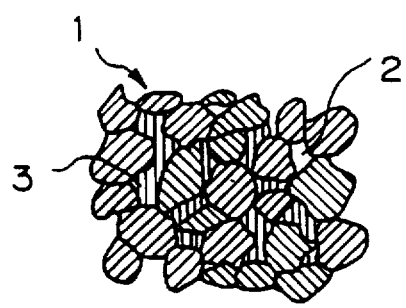
FIG. 1 shows schematically the structure of the sliding material of the invention.

The present invention will now be described in detail.

Ceramic powders are used in the invention as the starting material for the porous ceramic bodies and the ceramics have preferably the highest possible hardness in order to assure satisfactory wear resistance. While there are various kinds of ceramic materials including those based on metals, they must possess certain characteristics in order that they can be used as sliding materials and among such requirements are high hardness, high resistance to wear and seizure, low enough frictional coefficients to wear the mating member by only a small amount, high strength and thermal impact resistance, high thermal conductivity, and small enough specific gravities to reduce the centrifugal stress. Preferred examples of ceramic materials that satisfy these requirements are exemplified by, but not limited to, silicon carbide, silicon nitride, alumina, zirconia, titanium carbide, titanium nitride, boron nitride, boron carbide, and mixtures of two or more of these compounds. More preferred examples are silicon carbide, silicon nitride, born nitride, boron carbide, and mixtures of two or more of these compounds. As the particle size of ceramic powders increases, the mechanical strength of the sintered bodies will decrease; hence, in order to guarantee the use as sliding materials, it is preferable to use ceramic powders having an average particle size of no more than 10 μm.

The ceramic powders are shaped by conventional techniques such as injection molding, slip casting, extrusion molding, hot pressing and HIP, then sintered to produce ceramic bodies. It is optional to add sintering aids, binders and other additives in appropriate amounts. Sintering can also be performed by conventional techniques such as reactive sintering, normal sintering and pressure sintering. To make porous ceramic bodies that have open pores into which high water absorbing resins can be impregnated at a later stage, the fineness and particle size of the ceramic powders, as well as the amount of addition of binders as relative to the ceramic powders, and the sintering temperature should be adjusted. Another effective method is to impregnate ceramic powders in foams such as urethane foams and then sinter the assembly.

If the volume of open pores in the porous ceramic bodies is unduly high, sliding materials constructed by filling them with high water absorbing resins will have an impractically low mechanical strength. To avoid this problem, the volume of open pores in the ceramic bodies should preferably not exceed about 30%. On the other hand, if the volume of open pores is less than about 5%, the loading of high water absorbing resins in the open pores will decrease, making it difficult for the surface of the ceramic bodies to fully exhibit the intended lubrication by the combination of the water or moisture absorbing ability of the high water absorbing resins and their water retaining capacity. To avoid this problem, the volume of open pores in the ceramic bodies should preferably not be less than about 5%.

If the submersible bearings in pumps that are intended for handling slurries such as river water which contains hard sand are to be composed of the resin-impregnated sliding material of the invention, the volume of open pores in the ceramic bodies ranges preferably from about 5 to about 15%. As can be understood from the data in Example 2 which will be described later in this specification, high stress intensity factor and, hence, high tenacity, is insured if the volume of open pores lies within the stated range.

The porous ceramic bodies thus prepared are subsequently filled with high water absorbing resins. High water absorbing resins are believed to exhibit their water absorbing action by the interaction between two effects, one being the spread of molecular chains in polymeric electrolytes due to the repulsion of carboxyl ions within water and the other being the restriction of such spread by crosslinking points. High water absorbing resins, commonly referred to as "super-absorbents", are generally capable of absorbing water at least 100 times their own weight. Considering that resins that rely upon capillary action for interstitial water absorption can absorb water no more than about 20-30 times their own weight, one will readily see that high water absorbing resins have a surprisingly great ability to absorb water.

High water absorbing resins also "breathe" by absorbing moisture under humid conditions and releasing it under dry conditions. Another characteristics feature of high water absorbing resins is their ability to retain water under pressure; the greater part of the water once absorbed by the resins is retained even if pressure is exerted on the resins.

The high water absorbing resins may be classified by starting material into starches (graft polymers and carboxymethylated starches), celluloses (graft polymers and carboxymethyl cellulose (CMC)), and synthetic polymers (polyacrylates, polyvinyl alcohols, polyacrylamides and polyethylene oxides (PEO), etc.) While the high water absorbing resins are typically sold as white, amorphous powder products, they are also available in other forms such as spherical grains (pearls), granules, short fibers, long fibers, nonwoven fabrics, and films.

These high-water absorbing resins will absorb water the moment they are exposed to water. CMC and Poval are capable of absorbing from about 100 to about 400 g of water per gram, and poly(sodium acrylate) and starch/acrylic acid systems will absorb as much as about 1,000 g of water per gram.

Commercially available high water absorbing resins include the powders of crosslinked polyacrylates, the powder of isobutyrene/maleate system, the powder of starch/polyacrylate system, the powder of PVA/polyacrylic acid system, hydrolyzed acrylic fibers, the powder of crosslinked PVA, and the fibers of crosslinked CMC.

A variety of new uses have recently been proposed for high water absorbing resins, including applications as sanitary products (e.g., paper diapers and napkins), horticultural products such as soil water retainers and seed coating agents, civil engineering and construction materials such as sealants and anti-condensation agents, in food industry as keep-fresh packaging materials and cold insulators, medical devices such as contact lenses and thrombolytic materials, and electric or electronic devices such as moisture sensors and medical electrodes. However, there have been no reports that propose compositing sliding materials with high water absorbing resins.

The sliding material of the invention is characterized by filling the open pores in the porous ceramic body with the high water absorbing resin. If the resin impregnated ceramic body is used as the sliding part of bearings in a vertical pump, there is no need to inject water before pump startup for revolving the rotating shaft and yet the resin in the ceramic body absorbs and retains the water vapor in the surrounding moist air, thereby assuring satisfactory performance in the sliding part. For pump shutdown and another startup, there also exists no need for additional supply of water and the water that has been retained not only on the surface of the resin but also in its interior will permit the sliding part of exhibit consistent performance.

While various kinds of high water absorbing resins may be used in compositing ceramic sliding materials which are required to show consistent performance not only in fluids but also in gases, typically air atmosphere, as is often the case of vertical pumps, synthetic polymers are preferred and the most preferred synthetic polymers are polyacrylates and polyethylene oxides. If these resins are loaded in porous ceramic bodies, their great ability to absorb moisture insures that the water vapor and dew condensation in air atmosphere are effectively adsorbed on the resins. Additionally, those resins have great ability to retain water under pressure and, hence, ceramic materials that are filled with those resins can successfully be used to construct submersible bearings in vertical pumps.

The high water absorbing resins that are advantageously used as impregnates in porous ceramic bodies are specifically exemplified by products sold by The Nippon Synthetic Chemical Industry Co., Ltd. under the registered tradename "AQUARESERVE AP". They are slightly crosslinked copolymers of acrylic acid and sodium acrylate and available in several grades including AP-100 (average particle size, 300–450 μm), AP-200 (300–450 μm), AP-300 (300–450 μm), AP-150A (200–300 μm), AP-300A (200–300 μm), AP-100E (200–300 μm), and AP-300E (200–300 μm). Another advantageous example is a group of products sold by Sumitomo Seika Chemicals Co., Ltd. under the registered trademark "AQUAKEEP". They are crosslinked polyacrylates and available in various grades including 4S (average particle size, 20–30 μm), 10SH-NF (20–30 μm), 10SH-P (150–300 μm), 10SH (150–300 μm), 10SH-T(50) (300–500 μm), 10SH-T(60) (300–500 μm), 10SH-TS(50) (300–500 μm), 10SH-TS(65) (300–500 μm), EP (100–300 μm), ET (50–250 μm), SA50 (350–450 μm), SA60 (350–450 μm), SA50S (350–450 μm), SA60S (350–450 μm), and SA60N (250–350 μm), all being white powders.

When filling the open pores in the porous ceramic bodies with the high water absorbing resins, it is preferred to assure a large coveraged by the resins. To this end, either one of the following two methods may be employed: i) the resin particles are dispersed in a solvent to prepare a suspension, which is impregnated in the open pores in the ceramic body under pressure; or ii) the porous ceramic body is immersed in the resin that has gelled upon absorbing water and a vacuum is drawn so as to impregnate the resin in the open pores in the ceramic body. After the impregnation step, the ceramic body is heated at elevated temperature to remove the solvent or water by evaporation. The impregnation and heating process may be performed either once or a plurality of times.

The sliding material of the invention has a microscopic structure as shown in FIG. 1. It comprises a porous ceramic material 1 that has open pores or voids 2 filled with a high water absorbing resin 3.

Being a good electrical insulator, ceramics have high resistance to electrochemical corrosion that is caused by the generation of local cells or contact with dissimilar materials. Therefore, bearings that employ the ceramic sliding material of the invention in both the rotating and stationary members will exhibit consistent sliding performance even if they are placed within corrosive fluids. However, to assure ease in replacements of bearing members for use in pumps which are to handle running water that contains very hard solid matter as exemplified by sand-containing river water, it is preferred to compose the stationary members of the ceramic sliding material of the invention whereas the rotating members are composed of a cemented hard alloy.

Cemented hard alloys are those materials which have binder metals (e.g., Fe, Ni, Co, Ti, Cr and Mo) incorporated into the (powders of carbides, nitride, borides and silicides of elements of groups IV, V and VI of the periodic table, such as Ti, Zr, Hf, V, Nb, Ta, Cr, Mo, W and Th. Preferred examples are those which contain tungsten carbides (WC and $W_2C$), preferably in amounts of 40–95 wt %. Preferred binders are Ni, Co and Ti.

Cemented hard alloys are generally processed into shapes by sintering mixtures of the above-listed powders at elevated temperatures. However, not all rotating members need be composed of cemented hard alloys and, instead, stainless steel or other metal members may be overlaid with a cemented hard alloy layer that is deposited in a thickness of 1–2 mm by powder plasma transfer arc welding (PTA), thereby making rotating members.

Figure 2:
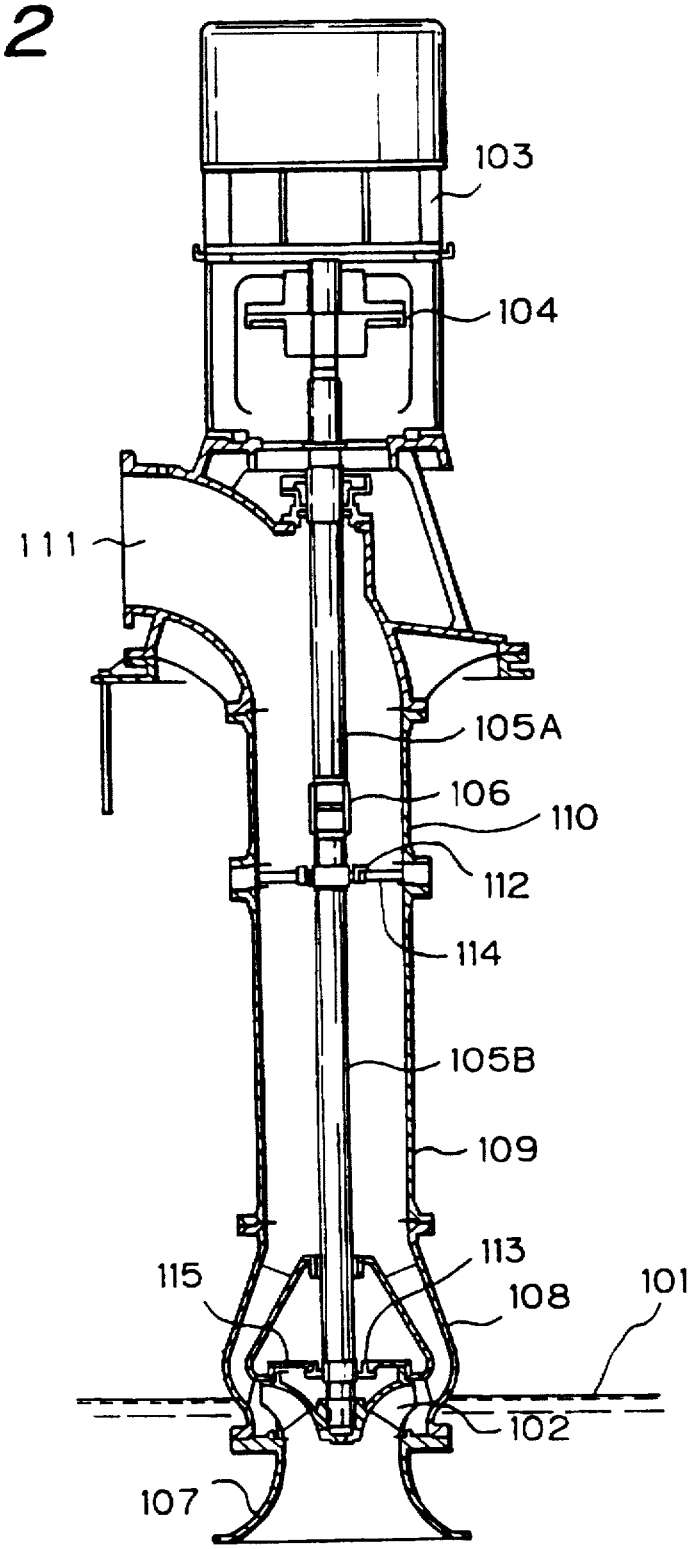
FIG. 2 is a schematic elevational view of a vertical axial-flow pump as it is fitted with the bearing of the invention.

FIG. 2 is a schematic elevational view of a vertical axial-flow pump as it is fitted with the bearing of the invention. Numeral 101 refers to the outside water level below which an impeller 102 is located. When a drive motor 103 starts to run, its rotation is transmitted through a shaft coupling 104, shafts 105A and 105B and an intermediate shaft coupling 106 to drive the impeller 102. The fluid to be pumped is drawn in through a suction bell 107, passed through a discharge bowl 108 and suspended casings 109 and 110 to be discharged through a discharge elbow 111. An upper submersible bearing 112 is supported by a shaft support 114 whereas a lower submersible bearing 113 is supported by a rib 115.

Figure 3:
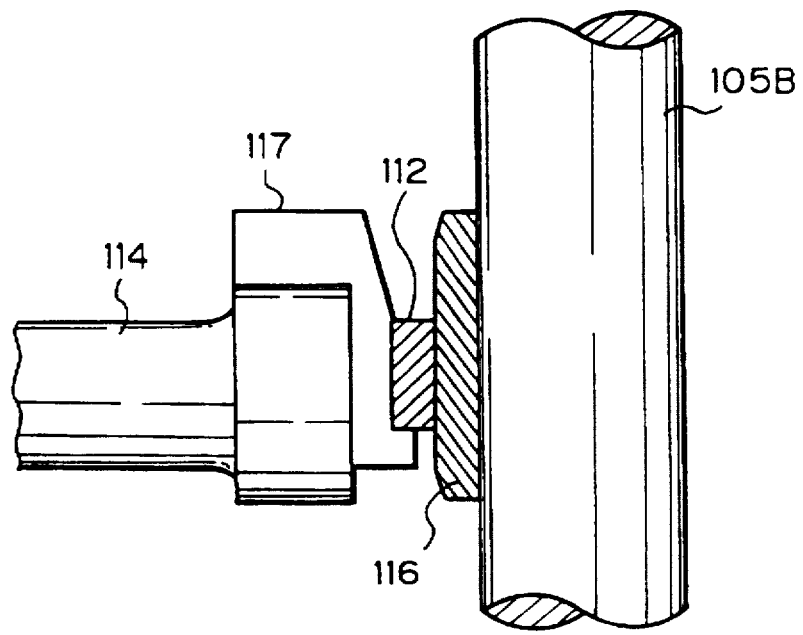
FIG. 3 is a schematic cross section showing enlarged one side of the bearing part of FIG. 2.

FIG. 3 is an enlarged schematic cross section showing one side of the bearing part shown in FIG. 2. The shaft 105B is combined with a cemented hard alloy sleeve 116 that is firmly secured to its circumference by means of fastening screws (not shown). The bearing 112 is secured to a casing 117 by shrink fitting and fixed on the shaft support 114. Securing the bearing 112 onto the casing 117 by shrink fitting offers the advantage of insuring that the rigidity of the ceramic body under a load is sufficiently increased to protect it against failure due to deformation.

The bearing ring need not be a solid cylindrical member but may consist of two or more cylindrical segments that are made of the sliding material of the invention and which are secured to the casing, as taught in JPA 85/30822. Since this design provides a comparatively wide clearance on the lateral side of each segment, any foreign matter in the fluid being pumped will flow axially through those clearances, thereby assuring even more consistent sliding performance when pumping slurries that contain hard solid matter.

Thus, the ceramic sliding material of the invention comprises a ceramic body having the open pores filled with the high water absorbing resin, which absorbs moisture such as water vapor and dew condensation when it is in air atmosphere, or absorbs water when it is submerged in water. Since the absorbed moisture or water is retained even under pressure, the sliding face is kept wet, or lubricated, irrespective of whether it is exposed to air atmosphere or water.

Additionally, the sliding material of the invention is highly durable and suitable for use in pumping slurries that contain hard solid matter since the surface layer will not be scraped by the hard solid matter.

Several examples of the invention will now be described with reference to accompanying drawings. The following examples are intended for illustrative purposes only and should by no means be taken as limiting the present invention.

EXAMPLE 1

Four different samples were prepared and measured for their frictional coefficients in the following manner.

Preparation of Samples

Samples 1 and 2 were within the scope of the invention whereas Samples 3 and 4 were outside the scope of the invention.

Sample 1

A silicon carbide ceramic powder having an average particle size of 10 μm was shaped by extrusion molding and sintered in an Ar atmosphere. The volume of open pores in the sinter was 10%. The sinter was then immersed in AQUAKEEP (polyacrylate) that had gelled upon absorbing water; a vacuum was drawn and heating was done, whereby the open pores in the sinter were filled with the resin. The sample thus prepared was shaped like a bearing ring that had an inside diameter of 75 mm and a width of 40 mm.

Sample 2

A silicon nitride ceramic powder having an average particle size of 10 μm was shaped by extrusion molding and sintered in an Ar atmosphere. The volume of open pores in the sinter was 10%. The sinter was then immersed in AQUAKEEP (polyacrylate) that had gelled upon absorbing water; a vacuum was drawn and heating was done, whereby the open pores in the sinter were filled with the resin. The thus prepared sample was of the same shape and dimensions as Sample 1.

Sample 3

A silicon carbide ceramic powder having an average particle size of 1 μm was shaped by extrusion molding and sintered in an Ar atmosphere. The volume of pores in the sinter was 0.5% but it had no open pores. The thus prepared sample was of the same shape and dimensions as Sample 1.

Sample 4

A silicon nitride ceramic powder having an average particle size of 1 μm was shaped by extrusion molding and sintered in an Ar atmosphere. The volume of pores in the sinter was 0.5% but it had no open pores. The thus prepared sample was of the same shape and dimensions as Sample 1.

Sliding Tests

Bearing Samples 1–4 were subjected to sliding tests for evaluation their performance in sliding contact with a shaft sleeve that was made of a cemented hard alloy consisting of 92% WC and 8% Co.

(1) Sliding Test 1

The shaft sleeve was held in sliding contact with each bearing sample as shown in FIG. 4. Shaft 121 had a SUS 304 sleeve 122A and a cemented hard alloy sleeve 122B secured firmly by means of fastening screws (not shown). Bearing 123 was secured to casing 124 by shrink fitting and also fixed to shaft support 125. Weight plate 126 was mounted in such a way that an imbalance was produced to apply a radial load. A motor (not shown) was run to rotate shaft 121.

The shaft was rotated at three different peripheral speeds, 4.0 m/sec, 6.0 m/sec and 7.5 m/sec, for 30 min. The test was conducted with the sliding part exposed to air atmosphere only (for Samples 1 and 2) or both immersed in fresh water and exposed to air atmosphere (for Samples 3 and 4).

The load to be exerted on the bearing consists of the centrifugal force due to the imbalanced weight of the impeller, the centrifugal force due to the wobbling of the rotor, and the nonequilibrium hydrodynamic force of the impeller. The two centrifugal components are calculable but the third component is not. Hence, the axial vibrational waveform was reduced significantly so that the nonequilibrium hydrodynamic force of the impeller would be negligibly small compared to the centrifugal forces and the sum of the two centrifugal forces, one being due to the imbalanced weight of the impeller and the other due to the wobbling of the rotor, was dealt with as the bearing load. The pressure on the bearing face was 170 MPa in terms of a maximum hertz stress.

After the end of the shaft rotation, frictional coefficient measurements were conducted and the results are shown in Table 1.

TABLE 1

| Sample | 4 m/s | 6 m/s | 7.5 m/s |
| --- | --- | --- | --- |
| SiC (in air atmosphere) | 0.42 | 0.38 | 0.38 |
| $Si_3N_4$ (in air atmosphere | 0.2 | 0.2 | 0.15 |
| SiC (in water) | 0.01 | 0.007 | 0.01 |
| $Si_3N_4$ (in water) | 0.007 | 0.01 | 0.008 |
| SiC (Sample 1 in air atmosphere) | 0.03 | 0.03 | 0.02 |
| $Si_3N_4$ (Sample 2 in air atmosphere) | 0.03 | 0.03 | 0.03 |

When tested in the practical range of peripheral speeds (4.0–7.5 m/s), the bearings of Samples 1 and 2, although exposed to air atmosphere, had their frictional coefficients (p) lowered to levels comparable to those attained when Samples 3 and 4 were immersed in water. On the other hand, Samples 3 and 4 showed very high frictional coefficients when exposed to air atmosphere. These data show that the ceramic sliding materials of the invention perform satisfactorily within air atmosphere even if they are not supplied with a lubricant and their lubricating property is comparable to that which is exhibited in water.

(2) Sliding test 2

Another sliding test was conducted within a water slurry containing a 1:1 mixture of clay and slit. The clap particles had an average size of 30 μm and the slid particles had an average size of 15 μm. The concentration of those particles was 60 mg/L. The other conditions of the sliding test were the same as in Test 1 except that the peripheral speed was adjusted to 5.05 m/s and the tester was operated for 200 h. The shaft was rotated at 1485 rpm and the pressure on the sliding face was 170 MPa in terms of maximum hertz stress.

The sliding faces of Samples 1 and 2 exhibited very consistent performance and no part was nicked or otherwise damaged by the clay or slit particles in the slurry. Hence, it is clear that the ceramic sliding materials of the invention also have outstanding tenacity.

EXAMPLE 2

Two sample groups were prepared and measured for their stress intensity factor in the following manner.

Sample Preparation

Sample Group 1

Silicon carbide ceramic powders having an average particle size of 10 μm were shaped by extrusion molding and sintered in an Ar atmosphere under varying conditions to give different values for the volume of open pores. The samples thus prepared measured 50×50×5 mm.

Sample Group 2

Silicon nitride ceramic powders having an average particle size of 10 μm were shaped by extrusion molding and sintered in an Ar atmosphere under varying conditions to give different values for the volume of open pores. The samples thus prepared measured 50×50×5 mm.

Stress Intensity Factor Measurements

The relationship between the volume of open pores (%) and the stress intensity factor $K_{IC}$ ($MPam^{1/2}$) was calculated for each sample group on the basis of empirical data.

Stress intensity factor $K_{IC}$ was calculated by formula (I) or (II) depending on the profile of cracks.

Formula (I) is:

$$(K_{IC}\Phi/Ha^{1/2})\,(H/E\Phi)^{0.4} = 0.129\,(c/a)^{1/2}$$

where $\Phi=0.3$ (constant);

H=Vickers hardness=$P/2a^2$;

P=load for Vickers hardness measurement;

E=Young's modules=300 GPa (for $Si_3N_4$) or 400 GPa (for SiC);

a=one half the diagonal length of the impression;

c=one half the length of the surface crack.

Figure 5A:
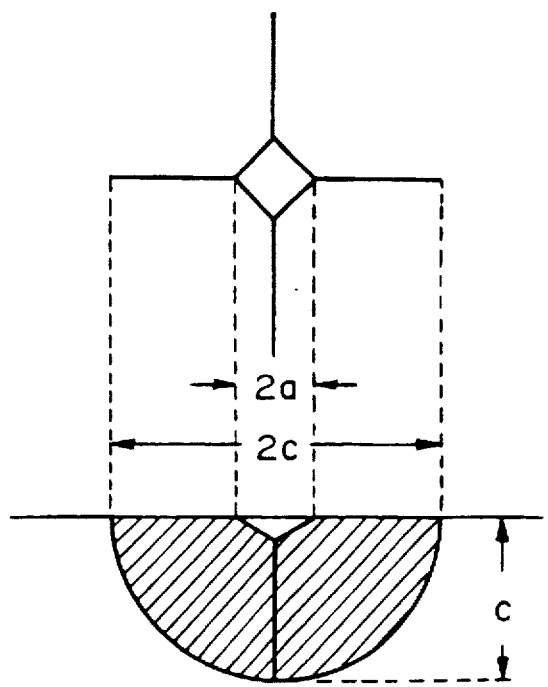
FIGS. 5A and 5B show the indentation as formed to calculate the stress intensity factor.

For correct understanding of the relationship between a and c, refer to FIG. 5(I).

Formula (II) is:

$$(K_{IC}\Phi/Ha^{1/2})\,(H/E\Phi)^{0.4} = 0.035\,(l/a)^{1/2}$$

where $\Phi=0.3$ (constant);

H=Vickers hardness=$P/2a^2$;

P=load for Vickers hardness measurement;

E=Young's modules=300 GPa (for $Si_3N_4$) or 400 GPa (for SiC);

a=one half the diagonal length of the impression;

l=the length of the surface crack.

Figure 5B:
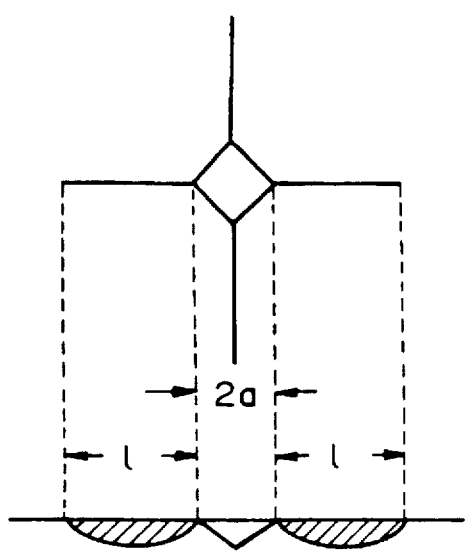

For correct understanding of the relationship between a and l, refer to FIG. 5(II).

Figure 6:
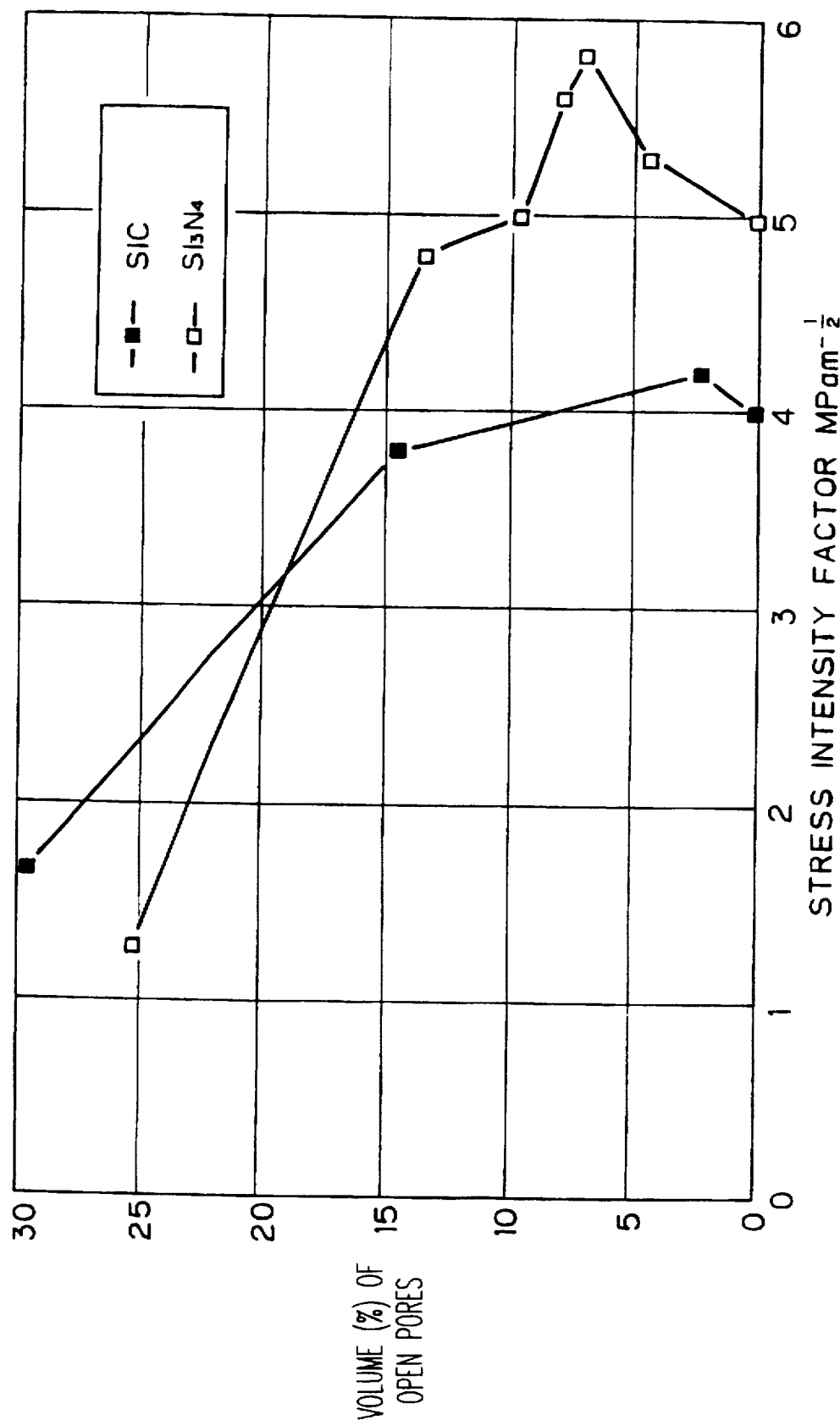
FIG. 6 is a graph showing the relationship between the volume of open pores in two porous ceramic bodies and their stress intensity factors, as measured empirically.

FIG. 6 is a graph showing the empirical relationship between the volume of open pores and the stress intensity factor for each ceramic type. Obviously, the stress intensity factor hardly decreased before the volume of open pores exceeded about 15%. The stress intensity factor is known to correlate well with the amount of wear, which decreases with the increasing stress intensity factor, as reported in "Friction and Wear of Hot Pressed Silicon Nitride and Other Ceramics", Transactions of ASME, Journal of Tribology, Vol. 108, October 1986. Therefore, porous ceramic bodies having open pores within the volume range from about 5 of about 15% would exhibit sliding characteristics comparable to or even better than those of solid ceramic bodies even if bearings made of those porous ceramic bodies were put to service in slurries containing hard solid matter. Particularly good sliding performance would be exhibited by silicon nitride ($Si_3N_4$).

An increased porosity also means the increased occurrence of cracks and, hence, it can generally hard and brittle materials such as ceramics have an increased risk of damage occurrence as their porosity increases. However, in Example 2, the volume of open pores was adjusted to lie within the stated appropriate range and this is believed to have contributed to the significant reduction, rather than increase, in the brittle nature of ceramic materials.

In summary, the ceramic sliding material of the invention makes effective use of the water absorbed by the high water absorbing resin so that the sliding face is kept wet to have a lower frictional coefficient and bearings that are formed of this sliding material will behave consistently at pump startup without the supply of lubricating water. Hence, there is no need to supply additional water from separate equipment.

The ceramic bearing that is formed of the ceramic sliding material of the invention may be properly adjusted in the volume of open pores so that it has wear resistance at least comparable to the value that has been achieved with the heretofore used solid ceramic bearings.

Obviously, numerous modifications and variations of the present invention are possible in light of the above teach-

What is claimed is:

1. A sliding material, comprising:
   a sintered porous ceramic body formed of open pores, wherein said porous ceramic body material selected from the group consisting of silicon carbide, silicon nitride, alumina, zirconia, titanium carbide, boron nitride and boron carbide wherein a volume of the open pores in the porous ceramic body ranges from about 5 to about 30%; and
   a water-absorbent resin, filling at least a portion of said open pores, for lubricating a surface of the porous ceramic body, wherein the water-absorbent resin is obtained by crosslinking either physically or chemically at least one water soluble high molecular weight compound selected from the group consisting of crosslinked polyacrylates, copolymers of acrylic acid and sodium acrylate, poly (sodium) acrylate and starch/acrylic acid, wherein said water-absorbent resin have the ability to absorb about 1,000 grams of water per gram of its own weight.

2. A sliding material according to claim 1 wherein the volume of the open pores is from about 5 to about 15%.

3. A sliding material according to claim 1, wherein said water-absorbent resin comprises polyacrylate.

4. A sliding material as claimed in claim 1, wherein the water-absorbent resin is obtained by crosslinking either physically or chemically at least one water soluble high molecular weight compound selected from the group consisting of crosslinked polyacrylates, isobutylene/maleate copolymer starch/polyacrylate copolymer, PVA/polyacrylic acid copolymer and hydrolyzed acrylic fibers.

5. A submersible bearing for use in both a fluid and a gaseous atmosphere, comprising:
   a rotating part consisting essentially of a cemented hard alloy and a stationary part, comprising:
   a sintered porous ceramic body formed of open pores, wherein said porous ceramic body material is selected from the group consisting of silicon carbide, silicon nitride, alumina, zirconia, titanium carbide, boron nitride and boron carbide wherein a volume of the open pores in the porous ceramic body ranges from about 5 to about 30%; and
   a water-absorbent resin, filling at least a portion of said open pores, for lubricating a surface of the porous ceramic body, wherein the water-absorbent resin is obtained by crosslinking either physically or chemically at least one water soluble high molecular weight compound selected from the group consisting of crosslinked polyacrylates, copolymers of acrylic acid and sodium acrylate, poly (sodium) acrylate and starch/acrylic acid, wherein said water based-absorbent resin have the ability to absorb about 1,000 grams of water per gram of its own weight.

6. A submersible bearing according to claim 5 wherein the volume of the open pores is from about 5 to about 15%.

7. A sliding material according to claim 5, wherein said water-absorbent resin comprises polyacrylate.

8. A submersible bearing as claimed in claim 5, wherein the water-absorbent resin is obtained by crosslinking either physically or chemically at least one water soluble high molecular weight compound selected from the group consisting of crosslinked polyacrylates, isobutylene/maleate copolymer starch/polyacrylate copolymer, PVA/polyacrylic acid copolymer and hydrolyzed acrylic fibers.

* * * * *